United States Patent

Rooks

[15] 3,668,642

[45] June 6, 1972

[54] SEQUENTIALLY ADDRESSABLE ALPHA-NUMERIC GAS TUBE DISPLAY DEVICE

[72] Inventor: John C. Rooks, Northfield, Minn.

[73] Assignee: G. T. Schjeldahl Company, Northfield, Minn.

[22] Filed: Mar. 31, 1970

[21] Appl. No.: 24,159

[52] U.S. Cl. ....................340/168, 340/167

[51] Int. Cl. ....................H04g 3/00

[58] Field of Search ....................340/168 SR

[56] References Cited

UNITED STATES PATENTS

| | | | |
|---|---|---|---|
| 2,861,216 | 11/1958 | England | 340/168 SR |
| 3,225,342 | 12/1965 | Clark | 340/168 SR |
| 3,493,933 | 2/1970 | Brooks | 340/168 SR |

*Primary Examiner*—Harold I. Pitts
*Attorney*—Orrin M. Haugen

[57] ABSTRACT

A sequentially addressable display system is disclosed wherein a plurality of stages, each including a series connected combination of a gas-filled diode, such as a neon glow tube, and a capacitor are coupled between a pair of voltage buses. Means are provided for coupling an input signal representative of a condition to the first stage of the system, with each succeeding state being coupled to its own immediately succeeding stage such that signals representing the state of each discrete stage can be propagated from stage to stage through the system, thus providing a transfer from the first stage to succeeding stages. A condition represented by an extinguished glow tube may also be propagated from stage to stage through the display system.

4 Claims, 2 Drawing Figures

PATENTED JUN 6 1972 3,668,642

Figure 1:
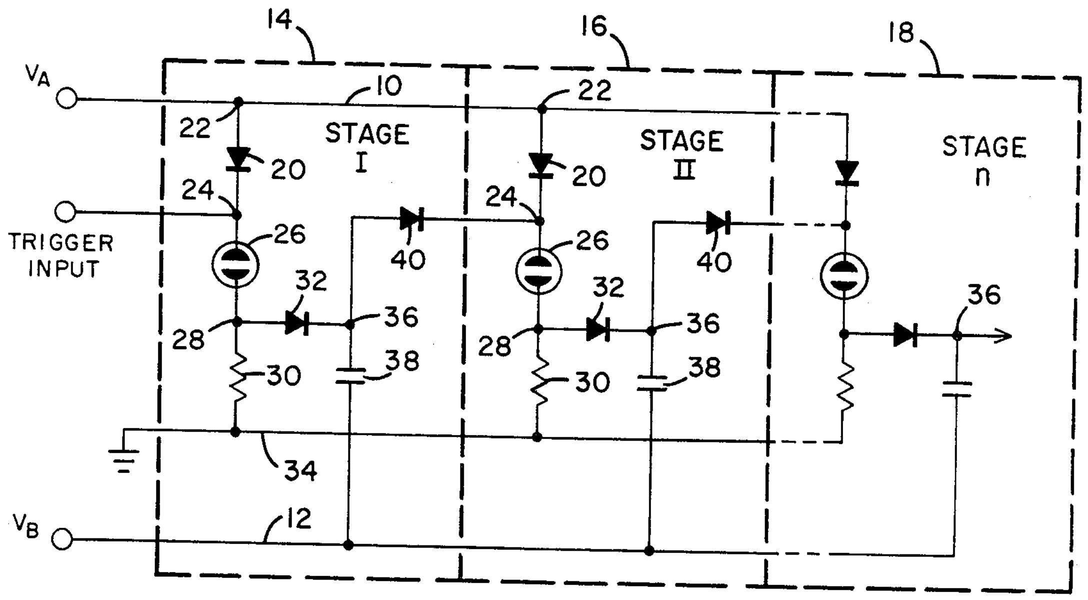

INVENTOR
JOHN C. ROOKS

BY Orrin M. Haugen
ATTORNEY

SEQUENTIALLY ADDRESSABLE ALPHA-NUMERIC GAS TUBE DISPLAY DEVICE

BACKGROUND OF THE INVENTION

In certain electroluminescent displays and display systems, it is found expedient to employ a multi-stage counter of the type incorporating gas-filled diodes (neon glow tubes) as the active element. Such electroluminescent displays utilize the light intensity produced by the firing of the glow tube to either provide a direct read-out or to illuminate photosensitive resistors employed to perform a function in a display selection matrix. Where the display system is large, it is essential that the gas-filled diode ring counter be quite simple and economical in terms of circuit components, so as to simplify servicing and to reduce the total cost of the display.

The Jiu U.S. Pat. No. 3,021,450 discloses a multi-stage ring counter of the type employing gas-filled diodes as an active element. However, each stage includes a gate transistor switch in series with a capacitor for coupling the output of a first stage to its immediately adjacent or neighboring stage. Because transistors of the type suitable for use in electroluminescent displays are relatively expensive, the ring counter disclosed in the Jiu patent will not lend itself to this desired application.

The present invention is concerned with the design of a sequentially addressable display employing a neon glow tube shift register which is capable of coupling an input signal representative of a condition to the first stage of the display with each succeeding stage being coupled to its own succeeding stage for the sequential transfer of its immediate condition on to its neighbor. The circuit is simple in its construction and mode of operation and does not employ relatively expensive circuit elements such as transistors.

In its simplest form, the circuit comprises a pair of voltage buses which are adapted to receive a pattern of pulses for operating the circuit. Coupled between these two buses are a plurality of individual stages each including a series combination of a first semi-conductor diode, a neon glow tube, a second semi-conductor diode and a capacitor. The output which appears at the junction between the second semi-conductor diode and the capacitor is coupled by a third semi-conductor diode to the junction between the first semi-conductor diode and the neon glow tube of an adjacent or succeeding stage. As long as no input trigger signal is applied to the neon glow tube of the first stage, the signals applied to the voltage buses will not cause the neon glow tubes in any stages to fire. However, when a trigger pulse is applied to ignite the first neon glow tube in the chain, a charge builds up on the capacitor for that stage such that when the input pulses applied to the buses again establish a potential difference, the voltage on the capacitor is added to this difference to exceed the firing or ignition point of the neon glow tube of the succeeding stage. Thus, the input signal may be made to provide a visual indication of a condition, and this indication or condition can be made to propagate down the chain to the ultimate stage. If the output of the last stage is connected to the input of the first stage, a ring type circuit results. By introducing digital data in serial fashion to the input terminal of the first stage in synchronism with the voltage pulses applied to the first and second buses, the circuit of this invention is capable of converting serial data into parallel form.

The system of the present invention is readily adaptable for use in connection with alpha-numeric displays. For example, the apparatus may be utilized in connection with a conventional seven-bar display system wherein each stage is represented by seven separate or individual and independently operated circuits. Thus, by an appropriate encoding of signals, the stages can be coupled together so as to provide a visual output of an electrical signal input in the form of numeric indicia. Thus, a sequence of numbers can be addressed to a multi-stage arrangement so so as to provide digital output in accordance with an indicated condition.

It will be appreciated, of course, that through the addition of neon glow tubes to the array, alphabetical or combined alpha-numeric displays are possible. Each of the neon tubes is, of course, displayed in the form of an appropriate portion of a character, such as, for example, elongated rectangular bars or the like. Neon glow tubes of this type are, of course, commercially available.

Accordingly, it is a principal object of the present invention to provide an improved means for addressing a display on a sequential basis, the system being simpler and less expensive in its construction than known prior art designs.

A further object of the present invention is to provide a shift register system suitable for use in electroluminescent display systems.

Figure 2:
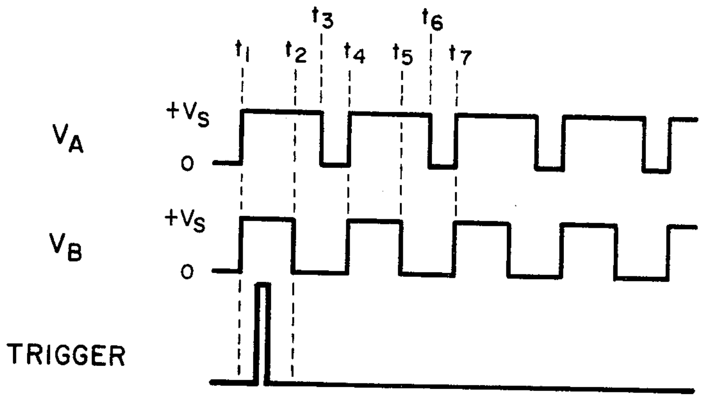

These and other objects of the invention will become apparent to those skilled in the art upon a study of the following specification, appended claims, and accompanying drawing wherein:

FIG. 1 is a schematic diagram of the preferred embodiment of the invention and showing a series of stages coupled together to form a sequentially addressable network; and FIG. 2 illustrates the preferred wave form pattern applied to the circuit of FIG. 1.

Referring now to FIG. 1, there is shown a first voltage bus 10 and a second voltage bus 12. Coupled in parallel between buses 10 and 12 are a plurality of sequentially arranged circuit stages indicated as stages I through n. The dashed line boxes 14, 16 and 18 serve to define the components comprising an individual stage. Specifically, stage I includes those components enclosed by dashed line box 14, while stage II comprises the components shown enclosed by dashed line box 16.

With attention being directed to FIG. 1, it is apparent that each stage is comprised of identical components. Specifically, each stage includes a first semi-conductor diode 20 having a first terminal 22 connected to the voltage bus 10 and a second input terminal 24 connected to a first electrode of a gas-filled diode or neon glow tube 26. The other electrode of the tube 26 is connected to a junction point 28 between a resistor 30 and a second semi-conductor diode 32. The other terminal of resistor 30 is connected to a ground bus 34. Diode 32 has its cathode electrode connected to a junction 36. A capacitor 38 is connected between junction 36 and the second voltage bus 12. Also, junction 36 is connected by means of a third semi-conductor diode 40 to the junction point 24 of stage II. Thus, it is the diode 40 which couples the output signal of stage I to the input terminal 24 of stage II.

OPERATION

With the details of the circuit construction having been presented, attention will be given to the mode of operation. In explaining the operation of the circuit of FIG. 1, it is assumed that the wave forms illustrated in FIG. 2 are applied to the buses 10 and 12, the wave form identified as $V_A$ being applied to bus 10 and the wave form identified as $V_B$ is applied to the bus 12. Assume further that upon initiation of operation, the circuit of FIG. 1 is in its quiescent stage with each of the capacitors 38 discharged.

At time $t_1$ the signals applied to the buses 10 and 12 simultaneously go positive and each reach an amplitude approximately equal to and in excess of the highest sustaining potential of any neon glow tube elements 26, but less than the ignition potential of any of the neon glow tube elements 26. Since the potential difference between the buses 10 and 12 is zero, and none of the capacitors 38 are yet charged, nothing occurs. At time $t_2$, the voltage applied to bus 12 falls to zero while the signal on bus 10 remains at the sustaining potential. While at this time a potential difference does exist between buses 10 and 12, the amplitude of this potential is below the ignition or firing point of the gas-filled tubes 26 and they remain non-conducting.

Now assume that between times $t_1$ and $t_2$ a trigger input signal of an amplitude greater than the firing voltage of the tube 26 is applied to junction 24 on stage I. This trigger input signal is sufficient to fire the neon glow tube 26 in stage I. Once fired, the trigger signal can be removed so long as the potential applied across the tube by bus 10 is at least as large as the sustaining potential of the tube.

With gas-filled tube 26 of stage I conducting, a current flows from the voltage source coupled to bus 10 through diodes 20 and 32 and through capacitor 38 of stage I to the bus 12 between time $t_2$ and $t_3$. This current causes a charge to be placed on capacitor 38. Because the gas-filled diodes 26 and stages II through n were not fired, no charge builds up on the capacitor 38 associated with these stages.

At time $t_3$, the sustaining potential applied to bus 10 is removed and the glow tube 26 of stage I is extinguished. However, the charge remains on capacitor 38 of stage I. At time $t_4$, the signals applied to buses 10 and 12 again simultaneously go positive to an amplitude equal to the sustaining potential of the gas-filled diodes employed. Again, because the potential difference applied across the series string of the diodes 20, 26, 32, and capacitor 38 is zero, the tube 26 will not fire. At time $t_5$, however, when the signal applied to bus 12 goes to zero, the voltage on the capacitor 38 of stage I adds to the sustaining potential applied between buses 12 and 34 such that gas-filled tube 26 in stage II fires. As before, the firing of the tube 26 in stage II permits a charging current to flow from the bus 10 through semi-conductor diode 20 and tube 26 and diode 32 of stage II to charge the capacitor 38 in stage II between time $t_5$ and $t_6$. Thus, it can be seen that the illumination of the glow tubes 26 moves sequentially down the chain of stages at a rate determined by the pulse pattern applied to buses 10 and 12. In a similar fashion, the non-illumination of neon glow tubes may be moved sequentially down the chain of stages.

By coupling the junction point 36 of stage n back to the trigger input terminal of stage I, and by introducing a diode similar to diode 40 in the input to the first stage, the circuit of FIG. 1 acts as a ring and continuous operation results.

The circuit of FIG. 1 may also be used to give an optical parallel output of serial inputted binary data. Specifically, if a serially clocked data stream is applied to the trigger input terminal of stage I in synchronism with the clock type pulses applied to buses 10 and 12, the string of binary 1's and 0's will propagate down the string and may be stopped at any time. When employed in this manner, a glowing tube may represent a binary 1 signal while a dark tube represents a binary 0 signal. When used in this fashion, the circuit of FIG. 1 is readily adaptable to use in an electroluminescent display system. Specifically, the serial data is displayed in the form of lamps which are either lighted or not lighted and these lamps may be employed as either a direct read-out with a series of alpha-numeric characters being propagated along a display chain, or the lamps may be associated with photosensitive cells on a drive matrix so that the current flowing through drive lines associated with an electroluminescent panel may be controlled.

As has been previously indicated, a display system will employ a plurality of individual stages, with each member of the plurality being representative of stage I of the circuit shown in FIG. 1. For example, a conventional seven-bar display assembly will employ seven individual circuits, each having its own series of stages. The gas-filled tube 26 will be displayed in the form of an elongated rectangular bar, and will represent one individual "bar" for the seven-bar numeric display. If desired, an additional set may be employed to provide a visual indication of a decimal point, if indicated.

In a typical application of the circuit shown in FIG. 1, diodes 20, 32 and 40 are typically of Type 1N5059, resistor 30 has a resistance value of 27,000 ohms, and capacitor 38 is 0.002 microfarads. The gas-filled diode 26 is preferably of Type No. NE2H available from the General Electric Company.

What is claimed is:

1. A multi-stage sequentially addressable binary circuit comprising:

a. first and second voltage buses;
b. a plurality of stages connected between said first and second buses, each of said stages being substantially identical and including the series connected string of a first semi-conductor diode, a gas-filled diode, a second semi-conductor diode, and a capacitor;
c. means connecting the junction between said gas-filled diode and said second semi-conductor diode to a point of fixed potential;
d. a third semi-conductor diode coupling the junction between said second semi-conductor diode and said capacitor of one stage to the junction between said first semi-conductor diode and said gas-filled diode of the adjacent stage; and
e. said first and second buses being adapted to receive a sequence of pulses whose voltage amplitude is equal to a value slightly in excess of the sustaining potential of said gas-filled diode, said sequence of pulses causing the gas-filled diode of said plurality of stages to be ignited in succession.

2. The multi-stage binary circuit as defined in claim 1 wherein said gas-filled diode is a neon glow tube.

3. A multi-stage sequentially addressable binary circuit comprising:

a. first and second voltage buses, each being coupled to a signal source;
b. a plurality of stages connected to said first and second buses, each of said stages being substantially identical and including a certain series connected string of a first semi-conductor diode, a gas-filled diode, a second semiconductor diode, and a capacitor;
c. first coupling means connecting the junction between said gas-filled diode and said impedance means to a point of fixed potential;
d. second coupling means connecting the junction between said second semi-conductor diode and said capacitor of one stage to the junction between said first semi-conductor diode and said gas-filled diode of the next adjacent stage; and
e. the arrangement being such that upon the conduction of said gas-filled diode, a current path is established through said series connected string with the signal source for said first voltage bus charging said capacitor, and said second coupling means being arranged to apply the residual charge from said capacitor to the gas-filled diode of the next adjacent stage coincidentally with the application of a cycle starting signal from said first voltage bus.

4. The multi-stage binary circuit as defined in claim 3 wherein the signal applied to said first voltage bus is interrupted for a finite period of time following the conducting event of said gas-filled diode.

* * * * *